US006742362B1

(12) United States Patent
Gadow et al.

(10) Patent No.: US 6,742,362 B1
(45) Date of Patent: Jun. 1, 2004

(54) COATING FOR TOOLS USED TO PROCESS HEAT TREATED GLASS

(75) Inventors: Rainer Gadow, Aschau (DE); Jochen Brand, Braunschweig (DE); Andreas Killinger, Filderstadt/Bernhausen (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/762,185

(22) PCT Filed: Aug. 2, 1999

(86) PCT No.: PCT/EP99/05603
§ 371 (c)(1),
(2), (4) Date: Apr. 5, 2001

(87) PCT Pub. No.: WO00/07951
PCT Pub. Date: Feb. 17, 2000

(30) Foreign Application Priority Data

Aug. 3, 1998 (DE) .......................... 198 34 968

(51) Int. Cl.$^7$ .................. C03B 40/00; B32B 33/00; B32B 31/00
(52) U.S. Cl. .............. 65/376; 65/374.1; 65/374.11; 65/374.13; 65/374.15; 428/688; 428/689; 428/697; 428/698; 428/457; 427/457; 427/585
(58) Field of Search ................ 428/446, 457, 428/688, 698, 689, 697; 106/285, 287.1; 427/457, 585; 65/374.11, 374.13, 374.15, 374.1, 376

(56) References Cited

U.S. PATENT DOCUMENTS

| 4,685,948 | A | * | 8/1987 | Kuribayashi et al. .......... 65/26 |
| 5,026,415 | A | * | 6/1991 | Yamamoto et al. ........... 65/305 |
| 5,368,939 | A | * | 11/1994 | Kawamura et al. ......... 428/408 |
| 5,380,349 | A | * | 1/1995 | Taniguchi et al. ............. 65/286 |
| 5,677,070 | A | * | 10/1997 | Dimigen et al. ............. 252/503 |
| 5,688,557 | A | * | 11/1997 | Lemelson et al. ...... 427/249.14 |
| 5,770,294 | A | * | 6/1998 | Sakamoto .................. 428/64.1 |
| 6,560,994 | B1 | * | 5/2003 | Hirota ........................... 65/24 |
| 6,591,636 | B1 | * | 7/2003 | Forenz et al. ............ 65/374.11 |

FOREIGN PATENT DOCUMENTS

| DE | 3832907 A1 | 4/1989 |
| DE | 3917752 A1 | 12/1989 |
| DE | 195 13 614 C1 | 10/1996 |
| DE | 196 36 352 C1 | 12/1997 |

OTHER PUBLICATIONS

Microstructure and Physical Properties of Metal–Containing Hydrogenated Carbon Films; Klages et al., Materails Science Foru vols. 52 & 53 (1989) pp. 609–644.*

* cited by examiner

Primary Examiner—Philip Tucker
Assistant Examiner—Michael J Feely
(74) Attorney, Agent, or Firm—Barnes & Thornburg

(57) ABSTRACT

The invention relates to a coating for tools that are used to process heat treated glass, e.g., molten glass or the like, to reduce the adhesion of said glass. The coating consists at least partially of a system of carbon-based layers and/or hard materials containing carbon.

17 Claims, No Drawings

COATING FOR TOOLS USED TO PROCESS HEAT TREATED GLASS

CROSS-REFERENCES TO RELATED APPLICATIONS

This application is a U.S. national application of international application Ser. No. PCT/EP99/05603 filed Aug. 2, 1999, which claims priority to German serial No. 198 34 968.8 filed Aug. 3, 1998.

The invention pertains a coating for tools, as well as to a tool used to process glass softened by means of heat and to a method for producing such coatings. Such coatings are needed for processing glasses softened by means of heat, such as molten glasses.

According to the state of art, tools made of steel, HSS, hard metal or ceramic are used during the processing of molten glasses and glasses softened by means of heat.

U.S. Pat. No. 5,380,349 describes a sintered material which contains sintered diamond particles and a suitable sintering aid. This layer is applied by means of CVD.

U.S. Pat. No. 5,026,415 describes a pressing tool which is coated with a layer made of a-C:H. The proportion of hydrogen in this layer is between 5 and 40%.

U.S. Pat. No. 5,770,249 describes a method for modifying metal pressing tools made of coatings containing carbon which have been modified through the incorporation of metal ions.

WO 99-47346 describes a device for molding flowable solids using pressing tools which have a coating made of amorphous carbon in a carbon network which is doped at least with hydrogen.

However, such tools, which have to be resistant to high temperatures, tend to adhere to the heated glass due to chemical and physical interactions. This gives rise to products with impurities or poor surface qualities which have to be refinished or even have to be thrown away as rejects. In addition, production interruptions occur as a result of the adhesion of the glass to the tools. As a result, according to the state of the art, coatings made of suspensions of finely distributed graphite and/or technical carbon blacks have proven somewhat successful for glass-processing tools of this type, such as forming tools, calibration arbors, etc. However, the surface quality of such coatings only satisfies average demands, and their abrasion resistance and the tool life of the coated tools is deficient. In some applications, galvanic coatings, chrome, nickel and nickel-tungsten are also being used with success.

Here again, however, an increase in the tool life is desirable.

The task of the invention is to make available a coating for tools, tools, and a method for coating tools used to process glasses softened by means of heat which suppresses or completely prevents the adhesion of glasses softened by means of heat.

This task is solved through the coating according to the introductory clause of Claim 1 in combination with its characterizing features, as well as through the tool according to Claim 11 and the method according to Claim 13. Advantageous further developments of the coating, tools and method according to the invention are given in the dependent claims.

By coating the tool with a system of carbon-based layers and/or carbon-containing hard materials, the tool is given an adhesion-inhibiting, wear-resistant and crack-resistant surface which suppresses or completely prevents the adhesion of glasses softened by means of heat such as molten glasses or softened and tempered glass semi-finished products. The layers containing carbon, diamond-like carbon coatings in particular, have only a limited lifetime in air above 400° C., and are therefore generally excluded from use as tools for processing glasses softened by means of heat. Surprisingly, however, the coatings according to the invention exhibit a long lifetime and very good wear and anti-adhesion properties in spite of the high temperatures occurring at the tool during the processing of hot glass. The resistance of the coatings according to the invention despite the high temperatures is surprising, and possibly is connected with the high thermal conductivity of the materials used for tools of this kind. The application of these coatings can be carried out by means of gas phase deposition methods such as CVD or PVD methods, even onto surfaces which are formed or curved in any desired way, and reproduces the surface topography of the tool. A partial component coating is also possible using this method.

The coatings according to the invention, the coated tools and the coatings produced by means of the method according to the invention make it possible to reduce or avoid the use of parting a compounds and lubricants, and allow a higher lifetime of tools for processing glass (wear protection), a reduction of down time and changeover times, as well as an improvement of the surface quality of the glass products and thus an avoiding of rejected parts. The coatings according to the invention are applied in particular to tools which come into contact with glasses treated by means of heat technology and with molten glasses, e.g., male molds, female molds, calibration tools or cutters.

The coatings applied by means of the CVD or PVD methods also suppress the adhesion of the glass for long periods of time and for high production numbers, and thus protect the tool against wear. a-C, i-C, Me-C:H coatings, Si—C:H coatings and hard material coatings containing carbon, such as TiC, ZrC, TiCN, ZrCN, CrC or CRCN, are especially well-suited.

Proving to be particularly favorable as metals for the ME-C:H coatings are Ti, W, Cr, Nb, Ta and/or Si, especially for the anti-adhesion properties of the coating. Advantageous metal contents lie between 1% and 40% (atomic percent).

The coating of the tools typically exhibits a layer thickness of 0.2 $\mu$m to 15 $\mu$m.

In the following, several examples of the coatings, tools and methods according to the invention will be given.

Tools for Glass:

The use of carbon-based layers on HSS or hard metal cutters for cutting drops from molten glasses, e.g., for the production of picture tubes.

Success: High tool lifetimes, avoiding of lubricant resulting in better glass quality.

Coating of calibration arbors for the production of glass tubes.

Success: No adhesion, resulting in improved surface quality.

An additional, very important application is the use of the coating on pressing tools for the production of picture tubes.

What is claimed is:

1. A tool used to process molten glass, the tool having a carbon-based coating on a surface, wherein the carbon-based coating comprises at least Me-C:H with said metal, Me, selected from the group consisting of Ti, W, Cr, Nb, Ta and Si; and wherein the carbon-based coating reduces adhesion of molten glass to the tool.

2. The tool according to claim 1, wherein the Me content is between 1% and 40% (atomic percent).

3. The tool according to claim 2, wherein the carbon-based coating further comprises at least one material selected from the group consisting of TiC, ZrC, TiCN, ZrCN, CrC, and CrCN.

4. The tool of claim 2, wherein the carbon-based coating exhibits a thickness of 0.2 μm to 15 μm.

5. The tool according to claim 1, wherein the carbon-based coating exhibits a thickness of 0.2 μm to 15 μm.

6. The tool according to claim 1, wherein the carbon-based coating is deposited by one of CVD and PVD.

7. The tool according to claim 1, wherein the carbon-based coating further comprises at least one material selected from the group consisting of TiC, ZrC, TiCN, ZrCN, CrC, and CrCN.

8. The tool of claim 1, wherein the tool is one selected from the group consisting of a cutting tool, a calibrating arbor, and an extrusion tool.

9. A tool used to process molten glass, the tool having a carbon-based coating on a surface, wherein the carbon-based coating comprises at least one material selected from the group consisting of a-C, i-C, Me-C:H, and Si—C:H, wherein Me is selected from the group consisting of Ti, W, Cr, Nb, and Ta, and at least one material selected from the group consisting of TiC, ZrC, TiCN, ZrCN, CrC, and CrCN; and wherein the carbon-based coating reduces adhesion of molten glass to the tool.

10. The tool of claim 9, wherein the carbon-based coating exhibits a thickness of 0.2 μm to 15 μm.

11. A method for producing a carbon-based coating on a tool used to process heat-treated glass, wherein the carbon-based coating is deposited onto at least a part of a surface of the tool by means of a gas phase deposition method, wherein deposited as the carbon-based coating, is a coating made of Me-C:H, which contains Ti, W, Cr, Nb, or Ta as the metal, Me, and wherein the carbon-based coating reduces adhesion of the heat-treated glass to the tool.

12. The method according to claim 11, wherein the Me content is between 1% and 40% (atomic percent).

13. The method according to claim 11, wherein the carbon-based coating further comprises at least one material selected from the group consisting of TiC, ZrC, TiCN, ZrCN, CrC, and CrCN.

14. The method according to claim 11, wherein the carbon-based coating exhibits a thickness of 0.2 μm to 15 μm.

15. The method of claim 11, wherein the tool is one selected from the group consisting of a cutting tool, a calibrating arbor, and,an extrusion tool.

16. A method of processing molten glass comprising the steps of:

coating a glass-processing tool at least partly with a carbon-based coating in order to reduce adhesion of the molten glass to the tool, and using the tool to contact and process the molten glass, wherein the carbon-based coating comprises at least one material selected from the group consisting of a-C, i-C, Me-C:H and Si—C:H, wherein Me is selected from the group consisting of Ti, W, Cr, Nb, and Ta, and wherein the tool is one selected from the group consisting of a cutting tool, a calibrating arbor, and an extrusion tool.

17. A method of processing molten glass comprising the steps of:

coating a glass-processing tool at least partly with a carbon-based coating in order to reduce adhesion of the molten glass to the tool, and using the tool to contact and process the molten glass, wherein the carbon-based coating comprises at least one material selected from the group consisting of TiC, ZrC, TiCN, ZrCN, CrC and CrCN, and wherein the tool is one selected from the group consisting of a cutting tool, a calibrating arbor, and an extrusion tool.

* * * * *